US008605228B2

(12) United States Patent
Watsuda et al.

(10) Patent No.: US 8,605,228 B2
(45) Date of Patent: Dec. 10, 2013

(54) DISPLAY DEVICE AND DISPLAY PANEL

(75) Inventors: Hirofumi Watsuda, Chu-Nan (TW); Norio Oku, Chu-Nan (TW)

(73) Assignee: Chimei Innolux Corporation, Chu-Nan (TW)

(*) Notice: Subject to any disclaimer, the term of this patent is extended or adjusted under 35 U.S.C. 154(b) by 273 days.

(21) Appl. No.: 13/117,039

(22) Filed: May 26, 2011

(65) Prior Publication Data

US 2012/0300146 A1 Nov. 29, 2012

(51) Int. Cl.
*G02F 1/136* (2006.01)

(52) U.S. Cl.
USPC .......... 349/43

(58) Field of Classification Search
None
See application file for complete search history.

(56) References Cited

U.S. PATENT DOCUMENTS

2008/0158469 A1* 7/2008 Lee .......... 349/58
2009/0219469 A1* 9/2009 Kim .......... 349/106

FOREIGN PATENT DOCUMENTS

TW I304510 12/2008

* cited by examiner

*Primary Examiner* — Lucy Chien
(74) *Attorney, Agent, or Firm* — Liu & Liu

(57) ABSTRACT

A display panel is provided and includes gate lines, source lines, and pixel units. Each gate line extends in a first direction, while each source line extends in a second direction interlacing with the first direction. The pixel units are arranged to form a display array. Each pixel unit is coupled to three sequentially disposed gate lines and three sequentially disposed source lines. Each pixel unit includes pixels. For each pixel unit, the pixels between any set of the two adjacent gate lines are coupled to different gate lines and different source lines. For each pixel unit, the pixels between one set of the two adjacent source lines are coupled to the same gate line and different source lines, and the pixels between the other set of the two adjacent source lines are coupled to different gate lines and different source lines.

16 Claims, 6 Drawing Sheets

| | EGL0 | EGL1 | EGL2 | EGL3 | EGL4 | EGL5 | EGL6 | → Time |
|---|---|---|---|---|---|---|---|---|
| GP1 (SL1, SL3, SL5) | + | - | - | + | + | - | - | ...... |
| GP0 (SL0, SL2, SL4, SL6) | - | + | + | - | - | + | + | ...... |

FIG. 2

DISPLAY DEVICE AND DISPLAY PANEL

BACKGROUND OF THE DISCLOSURE

1. Field of the Disclosure

The disclosure relates to a display panel, and more particularly to a display array with a novel pixel arrangement.

2. Description of the Related Art

A typical liquid crystal display (LCD) panel can have a display array with a pixel arrangement divided into two structures, Cs-on-Common structures and Cs-on-Gate structures, according to different formations of storage capacitors. In a display array with the Cs-on-Common structure, a storage capacitor of each pixel is formed between a pixel electrode and a common electrode. That is, the reference voltage of the storage capacitor is the potential of the common electrode. In a display array with the Cs-on-Gate structure, a storage capacitor of each pixel is formed between a pixel electrode and a previous or next gate line. That is, the reference voltage of the storage capacitor is the potential of the previous/next gate electrode. When the Cs-on-Common structure is used for a display array, since an extra connection to a common electrode is needed for a storage capacitor of each pixel, the aperture ratio of the display array is reduced. Because the Cs-on-Common structure has the disadvantage about low brightness caused by the low aperture ratio, the Cs-on-Gate structure is commonly used instead. Meanwhile, to reduce flicker and crosstalk of an LCD panel, a dot inversion driving method for driving pixels is commonly used for better image quality. However, the dot inversion driving method induces large power consumption.

Thus, it is desired to provide a display array with a pixel arrangement which solves the above problems.

BRIEF SUMMARY OF THE DISCLOSURE

An exemplary embodiment of a display panel (1) includes a plurality of gate lines (GL0-GL6), a plurality of source lines (SL0-SL6), and a plurality of pixel units (DU). Each of the plurality of gate lines (GL0-GL6) extends in a first direction (D1), while each of the plurality of source lines (SL0-SL6) extends in a second direction (D2) interlacing with the first direction. The plurality of pixel units (DU) are arranged to form a display array (10). Each pixel unit is coupled to three sequentially disposed gate lines among the plurality of gate lines and three sequentially disposed source lines of the plurality of source lines. Each pixel unit includes pixels. For each pixel unit (DU11), the pixels (P00, P01) between any set of the two adjacent gate lines (GL0, GL1) are coupled to different gate lines (GL0, GL1) and different source lines (SL1, SL2). For each pixel unit (DU11), the pixels (P00, P10) between one set of the two adjacent source lines (SL0, SL1) are coupled to the same gate line (GL1) and different source lines (SL0, SL1), and the pixels (P01, P11) between the other set of the two adjacent source lines (SL1, SL2) are coupled to different gate lines (GL0, GL2) and different source lines (SL1, SL2).

In another exemplary embodiment, the plurality of source lines are divided into a first group (GP0) and a second group (GP1), polarities of signals on the source lines of the first group are the same, and polarities of signals on the source lines of the second group are the same. Moreover, the polarities of the signals on the source lines of the first group are inverse to the polarities of the signals on the source lines of the second group.

In further another exemplary embodiment, the pixels of the plurality of pixel units are formed by a Cs-on-Gate structure.

The pixels of the plurality of pixel units are driven by signals on the plurality of gate lines with 4-level addressing.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein:

FIG. 2 shows switching of polarities of data signals on source lines during driving of gate lines in the display panel of FIG. 1;

DETAILED DESCRIPTION OF THE DISCLOSURE

The following description is of the best-contemplated mode of carrying out the disclosure. This description is made for the purpose of illustrating the general principles of the disclosure and should not be taken in a limiting sense. The scope of the disclosure is best determined by reference to the appended claims.

Figure 1:
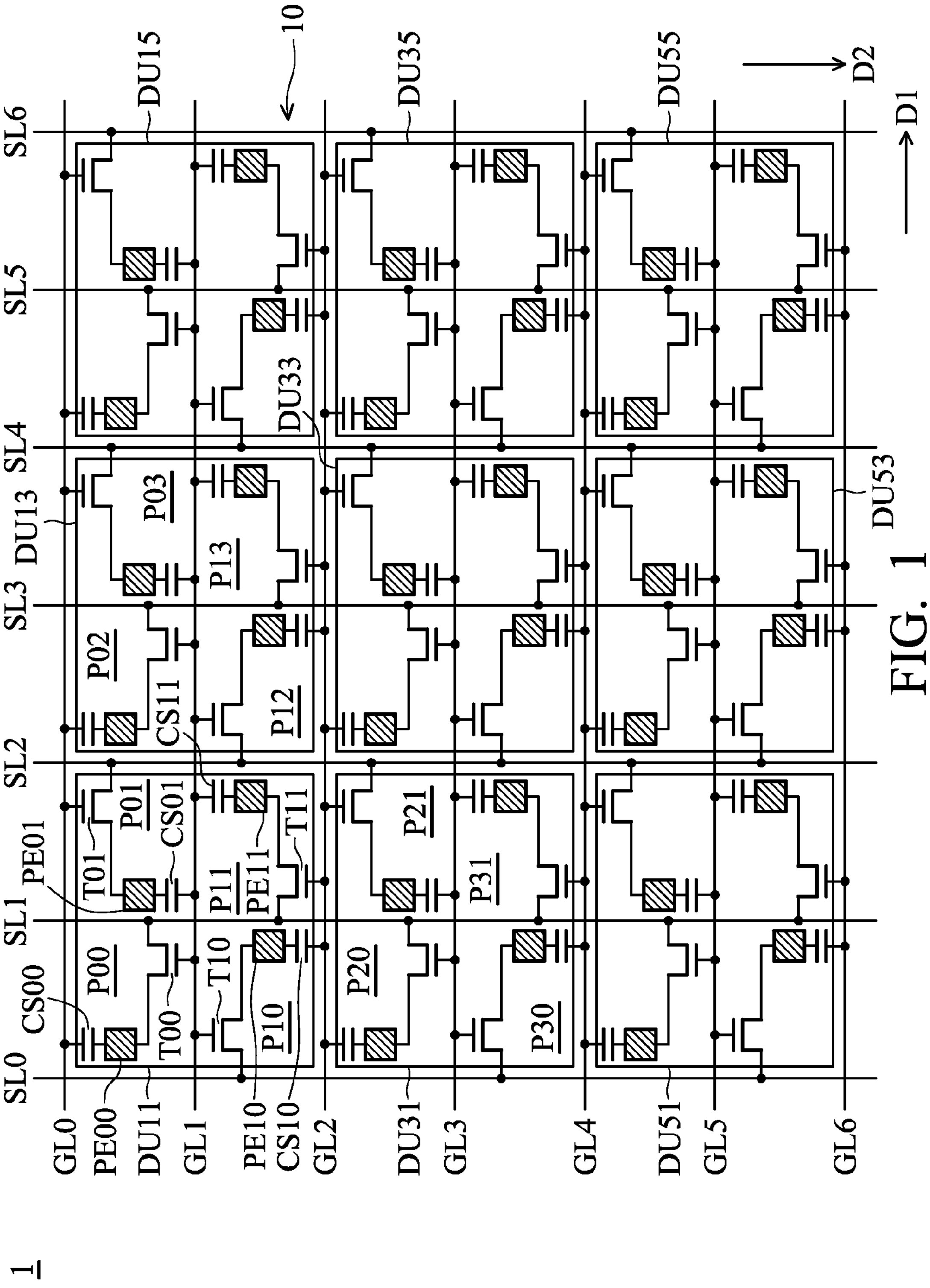
FIG. 1 shows an exemplary embodiment of a display panel.

Display panels are provided. In an exemplary embodiment of a display panel in FIG. 1, a display panel 1 includes a plurality of gate lines GL, a plurality of source lines SL, and a plurality of pixel units DU. In the embodiment of FIG. 1, seven gate lines GL0-GL6 and seven source lines SL0-SL6 are given as an example. Referring to FIG. 1, each of the gate lines GL0-GL6 extends in a first direction, such as the horizontal direction D1 of the display panel 1, and each of the source lines SL0-SL6 extends in a second direction interlacing with the first direction, such as the vertical direction D2 thereof. The gate lines GL0-GL6 are enabled sequentially. The pixel units DU are arranged to form a display array 10, and each pixel unit includes several pixels disposed in a sub-array. According to the embodiment, four adjacent pixels are grouped into one pixel unit DU. For example, four pixels P00, P01, P10, and P11 are grouped into a pixel unit DU11, four pixels P02, P03, P12, and P13 are grouped into a pixel unit DU13, and four pixels P20, P21, P30, and P31 are grouped into a pixel unit DU31. Pixel units DU15, DU33, DU35, DU51, DU53, and DU55 are defined with the above grouping of the pixel units DU11, DU13, and DU31. The pixel units have the same pixel arrangement, and each pixel of the pixel units includes a switch transistor T, a pixel electrode PE, and a storage capacitor CS. In the embodiment, the pixels are formed by a Cs-on-Gate structure. In the following, the pixel unit DU11 is given as an example for description of the pixel arrangement, and the other pixel units are composed by the same pixel arrangement.

Referring to FIG. 1, the pixel unit DU11 is coupled to three gate lines GL0-GL2 and three source lines SL0-SL2, the gate lines GL0-GL2 are disposed sequentially, and the source lines SL0-SL2 are also disposed sequentially. Accordingly, there are two sets of the two adjacent gate lines: one set includes the gate lines GL0 and GL1, and the other set includes the gate lines GL1 and GL2; and there are two sets of the two adjacent source lines: one set includes the source lines SL0 and SL1, and the other set includes the source lines SL1 and SL2. The four pixels P00, P01, P10, and P11 are disposed in a sub-array to define the pixel unit DU11. From a viewpoint from the pixel disposition in the horizontal direction D1 of the pixel unit DU11, the pixels P00 and P01 are disposed in the horizontal direction D1 between one set of the two adjacent gate lines GL0 and GL1, and the pixels P10 and P11 are disposed in the horizontal direction D1 between the other set of the two adjacent gate lines GL1 and GL2. From a viewpoint from the pixel disposition in the vertical direction D2 of the pixel unit DU11, the pixels P00 and P10 are disposed in the vertical direction D2 between one set of the two adjacent source lines SL0 and SL1, and the pixels P01 and P11 are disposed in the vertical direction D2 between the other set of the two adjacent source lines SL1 and SL2.

For the pixel P00, the gate of the switch transistor T00 is coupled to the gate line GL1, the drain of the switch transistor T00 is coupled to the source line SL1, and the storage capacitor CS00 is coupled between the gate line GL0 and the pixel electrode PE00. For the pixel P01, the gate of the switch transistor TO1 is coupled to the gate line GL0, the drain of the switch transistor TO1 is coupled to the source line SL2, and the storage capacitor CS01 is coupled between the gate line GL1 and the pixel electrode PE01. For the pixel P10, the gate of the switch transistor T10 is coupled to the gate line GL1, the drain of the switch transistor T10 is coupled to the source line SL0, and the storage capacitor CS10 is coupled between the gate line GL2 and the pixel electrode PE10. For the pixel P11, the gate of the switch transistor T11 is coupled to the gate line GL2, the drain of the switch transistor T11 is coupled to the source line SL1, and the storage capacitor CS11 is coupled between the gate line GL1 and the pixel electrode PE11.

According to the above pixel arrangement of each pixel unit, each pixel unit is coupled to three sequential gate lines and three sequential source lines. For each pixel unit, the two pixels which are disposed between any set of the two adjacent gate lines among the three gate lines are respectively coupled to the two adjacent gate lines and respectively coupled to two source lines among the three source lines. The pixels which are disposed between one set of the two adjacent source lines among the three source lines are coupled to the same gate line among the three gate lines and respectively coupled to the two adjacent source lines. The pixels which are disposed between the other set of the two adjacent source lines are respectively coupled to two gate lines among the three gate lines and respectively coupled to the two adjacent source lines.

According to the pixel arrangement of the pixel units, the source lines SL0-SL6 are divided into two groups GP0 and GP1. The source lines SL0, SL2, SL4, and SL6 belong to the group GP0, while the source lines SL1, SL3, and SL5 belong to the group GP1. Data signals on the source lines belonging to the same group have the same polarity, and the polarity of the data signal on each source line switches between positive and negative and stays the same during the enabling of the two adjacent gate lines. In detail, the polarities of the data signals SD0, SD2, SD4, and SD6 respectively on the source lines SL0, SL2, SL4, and SL6 belonging to the group GP0 are the same, while the polarities of the data signals SD0, SD3, and SD5 respectively on the source lines SL1, SL3, and SL5 belonging to the group GP1 are the same. However, the polarities of the data signal SD0, SD2, SD4, and SD respectively on the source lines SL0, SL2, SL4, and SL6 belonging to the group GP0 are inverse to the polarities of the data signals SD0, SD3, and SD5 respectively on the source lines SL1, SL3, and SL5 belonging to the group GP1. In the following, the switching of the polarity of the signal on one source line is described with the duration of the enabling of the gate lines GL1-GL4. In the group GP0, the polarity of the data signal on one source line, for example, the data source SD0 on the source line SL0, switches between positive (+) and negative (−), as shown in FIG. 2, and labels EGL0-EGL6 represent the duration of enabling of the gate lines GL0-GL6 respectively. Referring to FIG. 2, during the enabling of the gate lines GL1 and GL2 (the duration EGL1-EGL2), the polarity of the data signal SD0 on the source line SL0 stays positive (+). Then, the polarity of the data signal SD0 on the source line SL0 switches to negative (−) from positive and stays negative during the enabling of the gate lines GL3 and GL4 (the duration EGL3-EGL4). After, the polarity of the data signal SD0 on the source line SL0 switches to positive (+) from negative and stays positive during the enabling of the gate lines GL5 and GL6 (the duration EGL5-EGL6). In the group GP1, the polarity of the data signal on one source line, for example, the data source SD1 on the source line SL1, switches between positive (+) and negative (−), as shown in FIG. 2. Referring to FIG. 2, during the enabling of the gate lines GL1 and GL2 (the duration EGL1-EGL2), the polarity of the data signal SD1 on the source line SL1 stays negative, (−) which is inverse to the polarity (positive) of the data signal SD0 on the source line SL0 belonging to the group GP0. Then, the polarity of the data signal SD1 on the source line SL1 switches to positive (+), which is inverse to the polarity (positive) of the data signal SD0 on the source line SL0, and stays negative during the enabling of the gate lines GL3 and GL4 (the duration EGL3-EGL4). After, the polarity of the data signal SD1 on the source line SL1 switches to negative (−) from positive and stays negative during the enabling of the gate lines GL5 and GL6 (the duration EGL5-EGL6).

In the embodiment, seven gate lines GL0-GL1 are given as an example. However, regardless of the number of gate lines, the polarity of the data signal on each source line switches between positive and negative and stays the same during the enabling of the two adjacent gate lines. In some embodiment, at the beginning and/or end of enabling the gate lines, the polarity of the signal on each source line does not change during the enabling of just one gate line. For example, referring to FIG. 2, the polarity of the data signal on each source line of the group GP0 stays positive only during the enabling of the first gate line GL0, and the polarity of the data signal on each source line of the group GP1 stays negative only during the enabling of the first gate line GL0.

Figure 3:
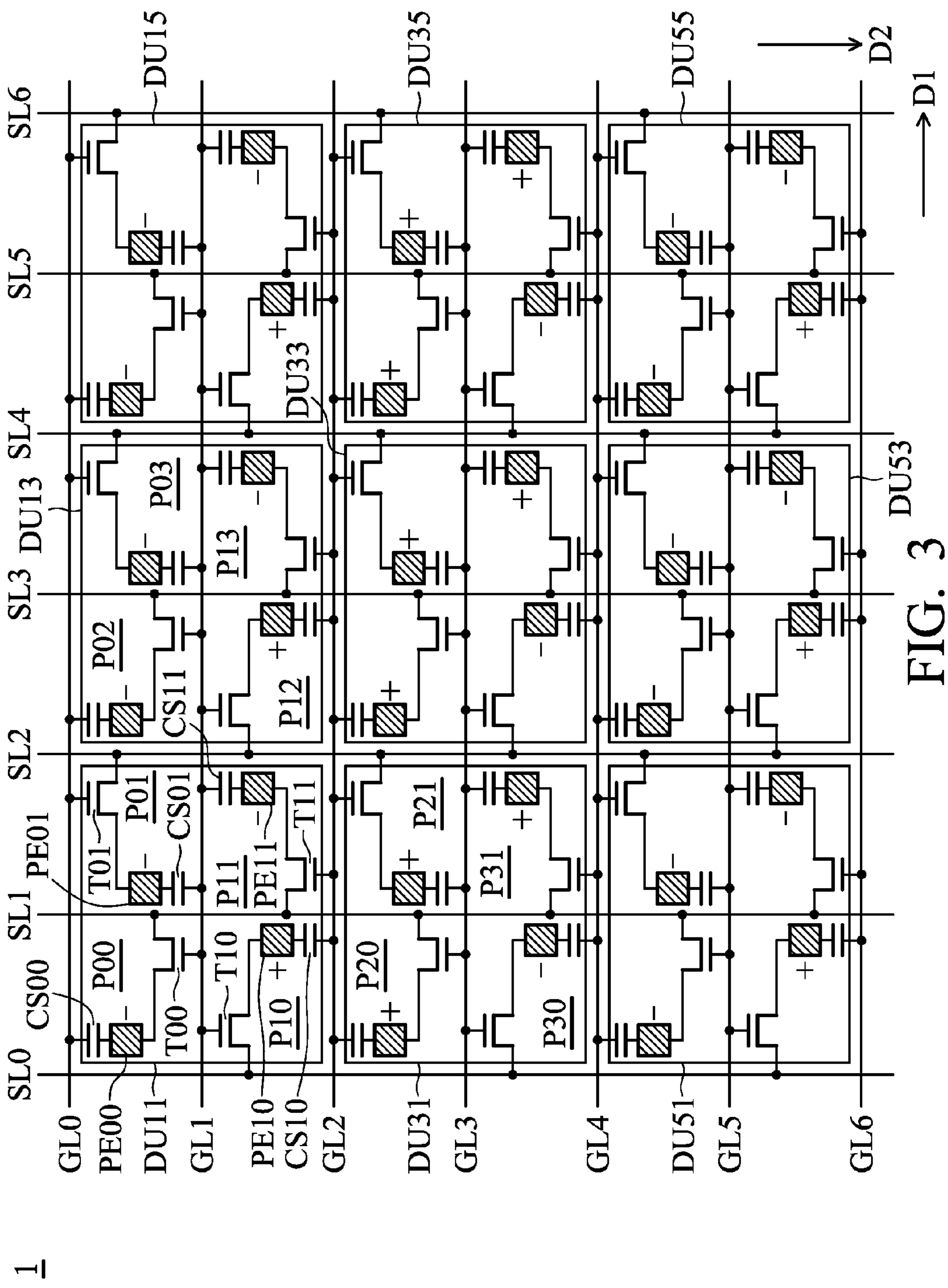
FIG. 3 shows polarity distribution of display voltages of pixels in the display panel of FIG. 1.

It has been known that, for each pixel, a display voltage is formed between a common line (formed above or under the pixel electrode PE, not shown in FIG. 1) and the corresponding pixel electrode PE. In the embodiment, the common line carries a direct-current (DC) voltage signal. As the above description, the gate lines GL0-GL6 are enabled sequentially. By applying of the timing of the enabling of the gate lines GL0-GL6 and the above switching of the polarities of the data signals to the pixel arrangement of FIG. 1, the polarities of the display voltages of the pixels may be as shown in FIG. 3. For each pixel unit, such as the pixel unit DU11, the polarity of the display voltage of the pixel P00 is inverse to that of the pixel P10, while the polarity of the display voltage of the pixel P01 is the same as that of the pixel P11. Referring to FIG. 3, for the overall panel 1, the polarity distribution of the display voltages of the pixels is not common, such as a line inversion driving and a dot inversion driving. The polarity distribution is composed of an alternation of the line inversion and dot inversion. Thus, flicker and crosstalk of the display panel 1 may be reduced for better image quality.

Figure 4:
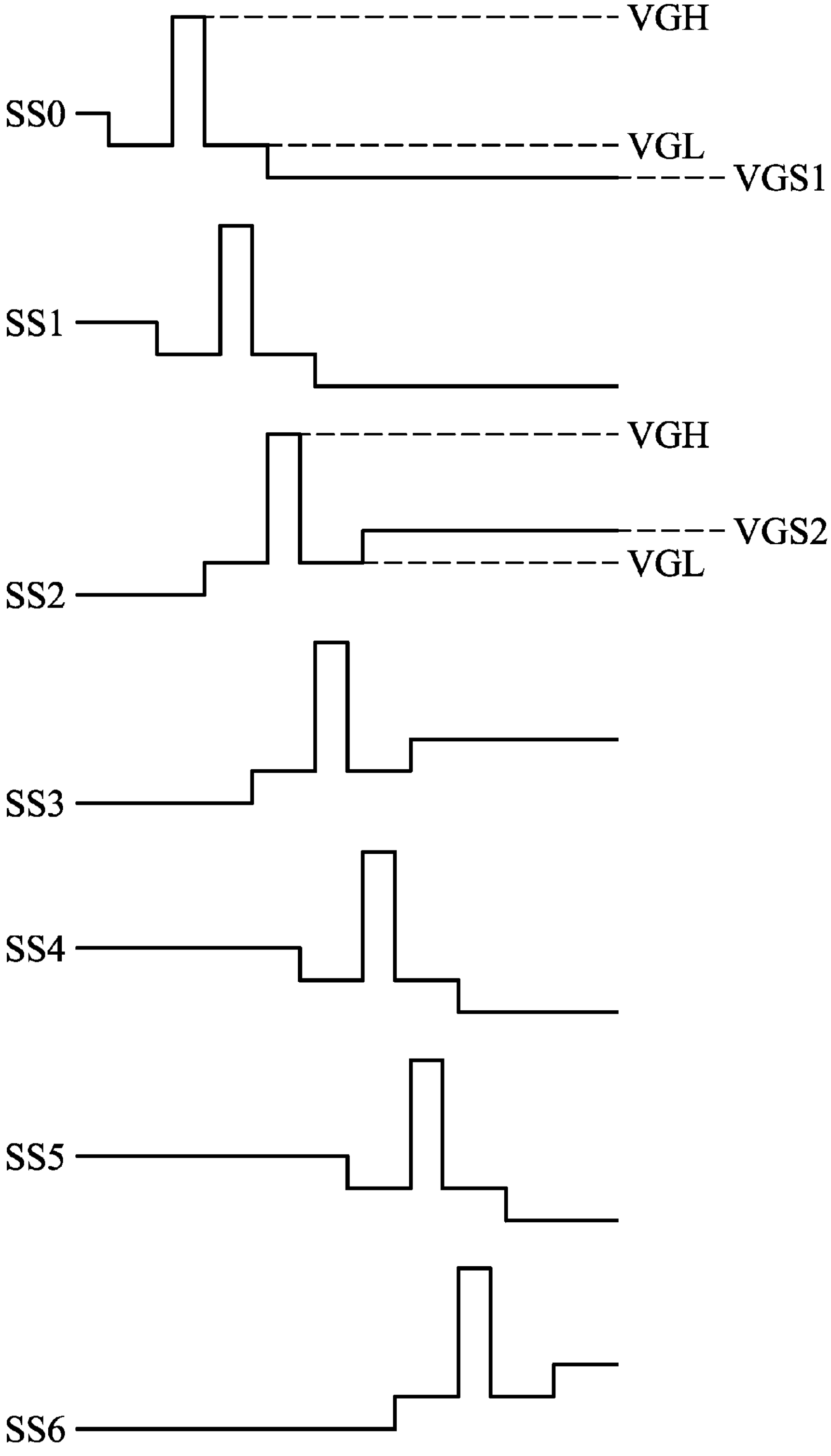
FIG. 4 shows waveform of scan signals on gate lines in the display panel of FIG. 1.

In the embodiment, since the pixels are formed by a Cs-on-Gate structure, the pixels are driven by scan signals SS0-SS6 respectively on the gate lines GL0-GL6 with 4-level addressing for lowering power consumption. As shown in FIG. 4, each scan signal changes between four voltage levels VGH, VGL, VGSH, and VGSL. The scan signals SS0, SS1, SS4, and SS5 respectively on the adjacent gate lines GL0, GL1, GL4, and GL5 have the same waveform, and the scan signals SS2, SS3, and SS6 respectively on the adjacent gate lines GL2, GL3, and GL6 have the same waveform. From another viewpoint, for each pixel unit, such as the pixel unit DU11 coupled to the gate lines GL0-GL2, the scan signals SS0 and SS1 respectively on one set of the two adjacent gate lines GL0 and GL1 among the gate lines GL0-GL2 have the same waveform, while the scan signals SS1 and SS2 respectively on the other set of the two adjacent gate lines GL1 and GL2 among the gate lines GL0-GL2 have different waveforms. For each pixel unit, such as the pixel unit DU31 coupled to the gate lines GL2-GL4, the scan signals SS2 and SS3 respectively on one set of the two adjacent gate lines GL2 and GL3 among the gate lines GL2-GL4 have the same waveform, while the scan signals SS3 and SS4 respectively on the other set of the two adjacent gate lines GL3 and GL4 among the gate lines GL2-GL4 have different waveforms.

Figure 5:
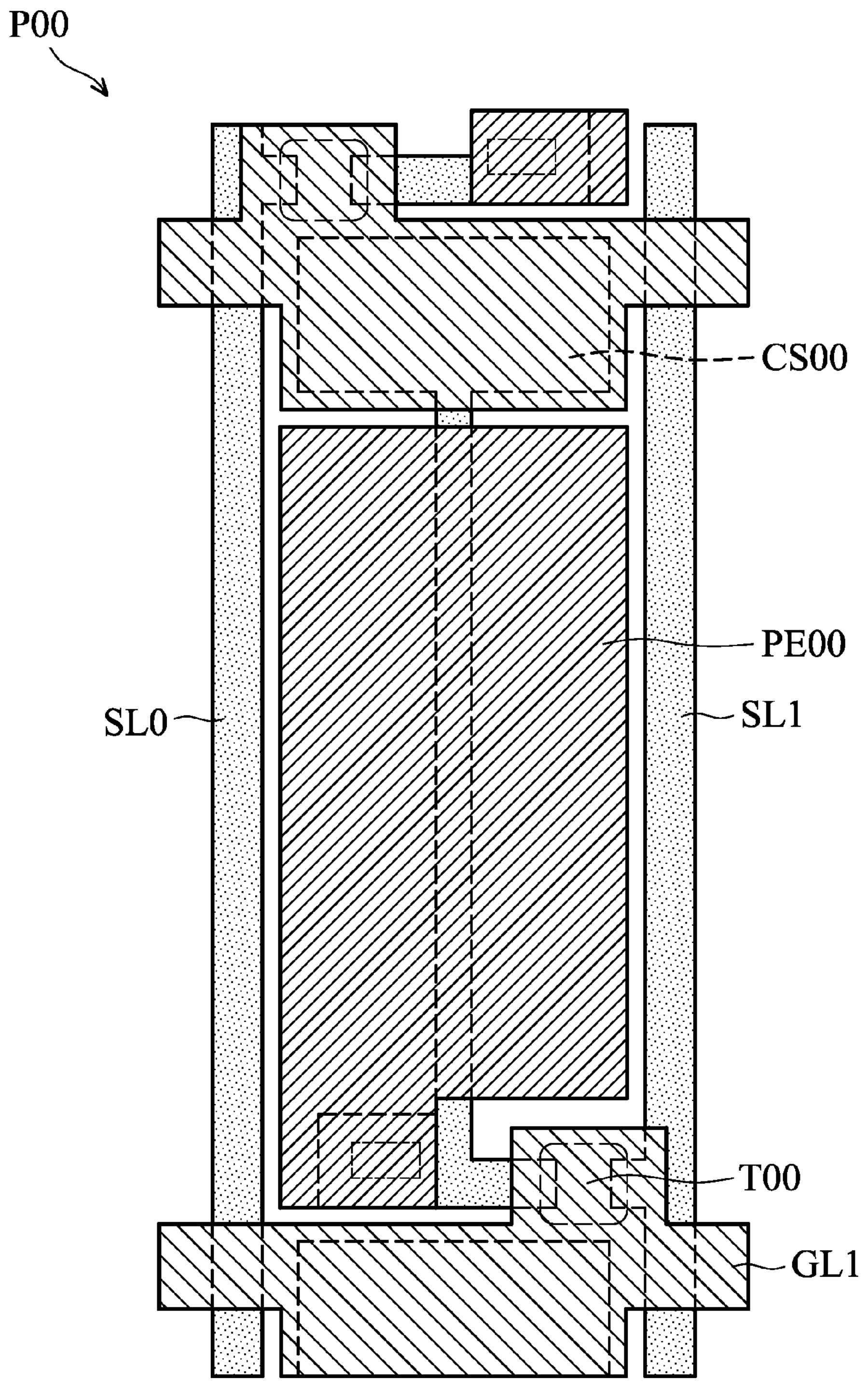
FIG. 5 shows an exemplary embodiment of pixel layout of the display panel of FIG. 1.

FIG. 5 shows an exemplary embodiment of layout of one pixel of the display panel 1. In FIG. 5, the pixel P00 is given as an example for clarity. The gate of the switch transistor T00 is coupled to the gate line GL1, and the drain of the switch transistor T00 is coupled to the source line SL1. The storage capacitor CS00 is formed between the gate line GL0 and the pixel electrode PE00.

According to the above embodiment, by using the pixel arrangement shown in FIG. 1 and the switching of the polarities of the data signals shown in FIG. 3, the polarity distribution is composed of an alternation of line inversion driving and dot inversion driving, and the pixels are driven by 4-level addressing in FIG. 4. Thus, flicker and crosstalk of the display panel 1 may be reduced for better image quality, and power consumption thereof may be lowered. Moreover, the pixels of the display panel 1 are formed by a Cs-on-Gate structure. Thus, the display panel 1 has higher aperture ratio. the pixels are driven by 4-level addressing for lowering power consumption.

Figure 6:
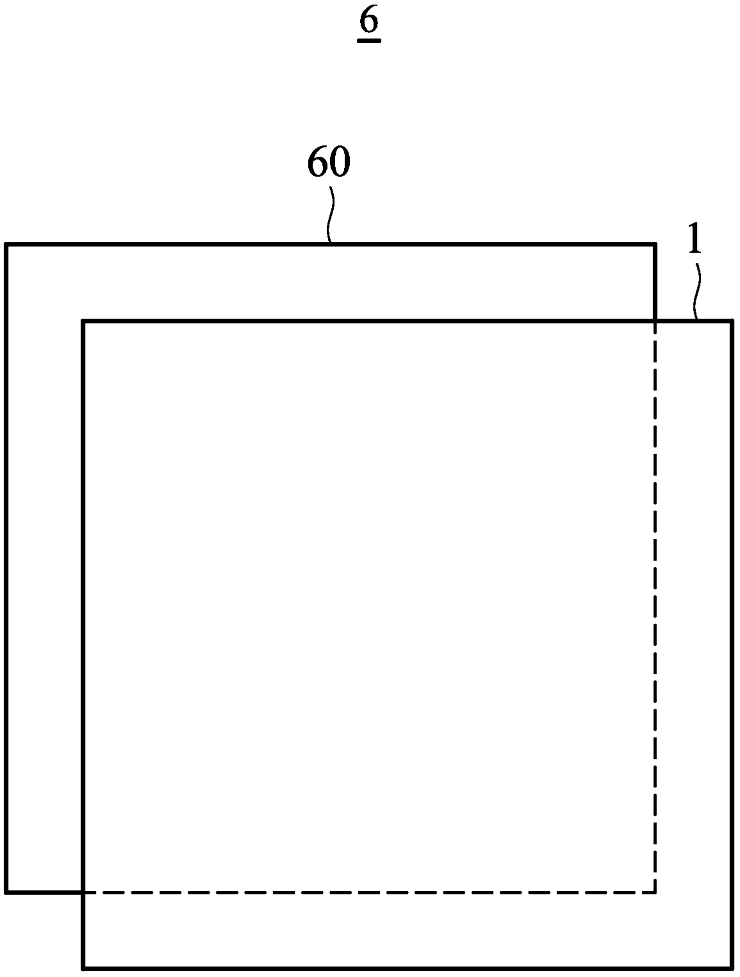
FIG. 6 shows an exemplary embodiment of a display device.

FIG. 6 shows an exemplary embodiment of a display device. As shown in FIG. 6, a display device 6 includes a backlight unit 60 and the display panel 1 of FIG. 1. The backlight unit 60 is disposed on one side of the display panel 1 for providing light to the display panel 1, so that the display panel 1 can display images by using the arrangement of the display array 10 and the illumination of the light.

While the disclosure has been described by way of example and in terms of the preferred embodiments, it is to be understood that the disclosure is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A display panel comprising:

a plurality of gate lines, each extending in a first direction;

a plurality of source lines, each extended in a second direction interlacing with the first direction; and a plurality of pixel units arranged to form a display array, each coupled to three sequentially disposed gate lines among the plurality of gate lines and three sequentially disposed source lines of the plurality of source lines and comprising pixels;

wherein, for each pixel unit, the pixels between any set of the two adjacent gate lines are coupled to different gate lines and different source lines, wherein, for each pixel unit, the pixels between one set of the two adjacent source lines are coupled to the same gate line and different source lines, and the pixels between the other set of the two adjacent source lines are coupled to different gate lines and different source lines wherein each pixel unit is coupled to sequential first, second, and third gate lines and sequential first, second, and third source lines and comprises first, second, third, and fourth pixels disposed in a sub-array, wherein for each pixel unit, the first and second pixels are disposed between the first and second gate lines, respectively coupled to the second and first gate lines, and respectively coupled to the second and third source lines, and wherein for each pixel unit, the first and third pixels are disposed between the first and second source lines, and the third pixel is coupled to the second gate line and the first source line.

2. The display panel as claimed in claim 1, wherein for each pixel unit, the second and fourth pixels are disposed between the second and third source lines, and the fourth pixel is coupled to the third gate line and the second source line.

3. The display panel as claimed in claim 2, wherein the third and fourth pixels are disposed between the second and third gate lines.

4. The display panel as claimed in claim 2, wherein for each pixel unit, each of the first to fourth pixels comprises a storage capacitor and pixel electrode;

wherein for the first pixel of each pixel unit, the storage capacitor is coupled between the first gate line and the corresponding pixel electrode;

wherein for the second pixel of each pixel unit, the storage capacitor is coupled between the second gate line and the corresponding pixel electrode;

wherein for the third pixel of each pixel unit, the storage capacitor is coupled between the third gate line and the corresponding pixel electrode; and wherein for the fourth pixel of each pixel unit, the storage capacitor is coupled between the second gate line and the corresponding pixel electrode.

5. The display panel as claimed in claim 2, wherein for each pixel unit, each of the first to fourth pixels is coupled to a common line and has a pixel electrode, and a display voltage of each of the first to fourth pixels is generated between the common line and the corresponding pixel electrode; and wherein for each pixel unit, a polarity of the display voltage of the first pixel is inverse to a polarity of the display voltage of the third pixel, and a polarity of the display voltage of the second pixel is the same as a polarity of the display voltage of the fourth pixel.

6. The display panel as claimed in claim 2, wherein for each pixel unit, a polarity of a signal on the first source line is the same as a polarity of a signal on the third source line and inverse to a polarity of a signal on the second source line.

7. The display panel as claimed in claim 6, wherein for each pixel unit, the polarity of the signal on each of the first to third source lines switches between positive and negative and stays the same for two adjacent gate lines among the first to third gate lines.

8. A display panel comprising:

a plurality of gate lines, each extending in a first direction;

a plurality of source lines, each extended in a second direction interlacing with the first direction; and a plurality of pixel units arranged to form a display array, each coupled to three sequentially disposed gate lines among the plurality of gate lines and three sequentially disposed source lines of the plurality of source lines and comprising pixels;

wherein, for each pixel unit, the pixels between any set of the two adjacent gate lines are coupled to different gate lines and different source lines, wherein, for each pixel unit, the pixels between one set of the two adjacent source lines are coupled to the same gate line and different source lines, and the pixels between the other set of the two adjacent source lines are coupled to different gate lines and different source lines, wherein the plurality of source lines are divided into a first group and a second group, polarities of signals on the source lines of the first group are the same, and polarities of signals on the source lines of the second group are the same, and wherein the polarities of the signals on the source lines of the first group are inverse to the polarities of the signals on the source lines of the second group.

9. The display panel as claimed in claim 8, wherein for each of the first and second groups, the polarity of the signal on each source line switches between positive and negative and stays the same for two adjacent gate lines among the plurality of gate lines.

10. The display panel as claimed in claim 2, wherein for each pixel unit, the first to fourth pixels are driven by signals on the first to third gate lines with 4-level addressing.

11. The display panel as claimed in claim 10, wherein for each pixel unit, the signals on the first and second gate lines have the same waveform.

12. The display panel as claimed in claim 1, wherein the pixels of the plurality of pixel units are formed by a Cs-on-Gate structure.

13. The display panel as claimed in claim 1, wherein the pixels of the plurality of pixel units are driven by signals on the plurality of gate lines with 4-level addressing.

14. The display panel as claimed in claim 13, wherein for each pixel unit, the signals on one set of the two adjacent gate lines among the three sequentially disposed gate lines have the same waveform.

15. The display panel as claimed in claim 13, wherein for each pixel unit, the signals on the other set of the two adjacent gate lines among the three sequentially disposed gate lines have different waveforms.

16. A display device comprising:

a display panel as claimed in claim 1; and a backlight unit providing light to the display panel.

* * * * *